March 10, 1970  TAKUO ISHIDA ET AL  3,499,346
INDICATING SYSTEM OF SPEED-CHANGING CONDITION FOR A BICYCLE
Filed May 22, 1968  3 Sheets-Sheet 2
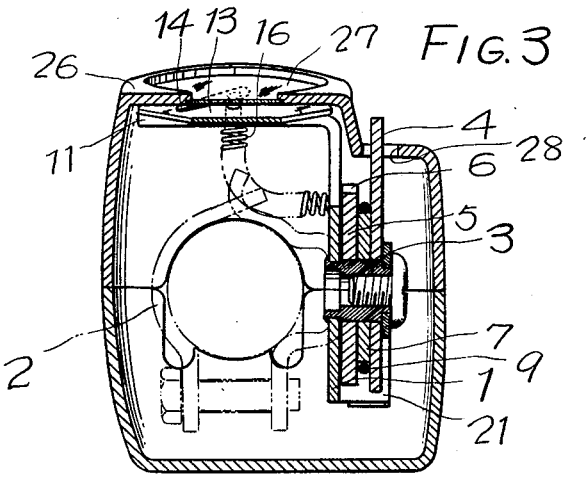
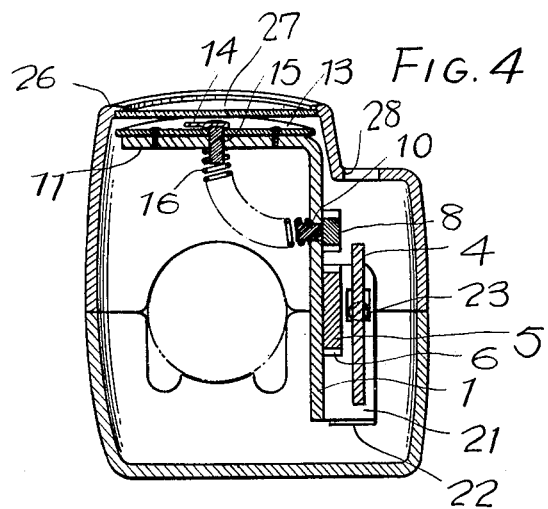
INVENTOR
TAKUO ISHIDA
AND MASAYOSHI KINE
BY
ATT.

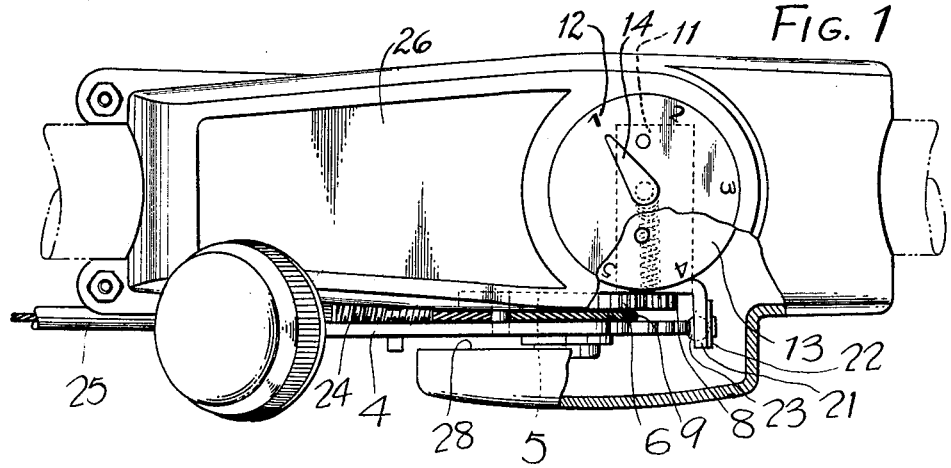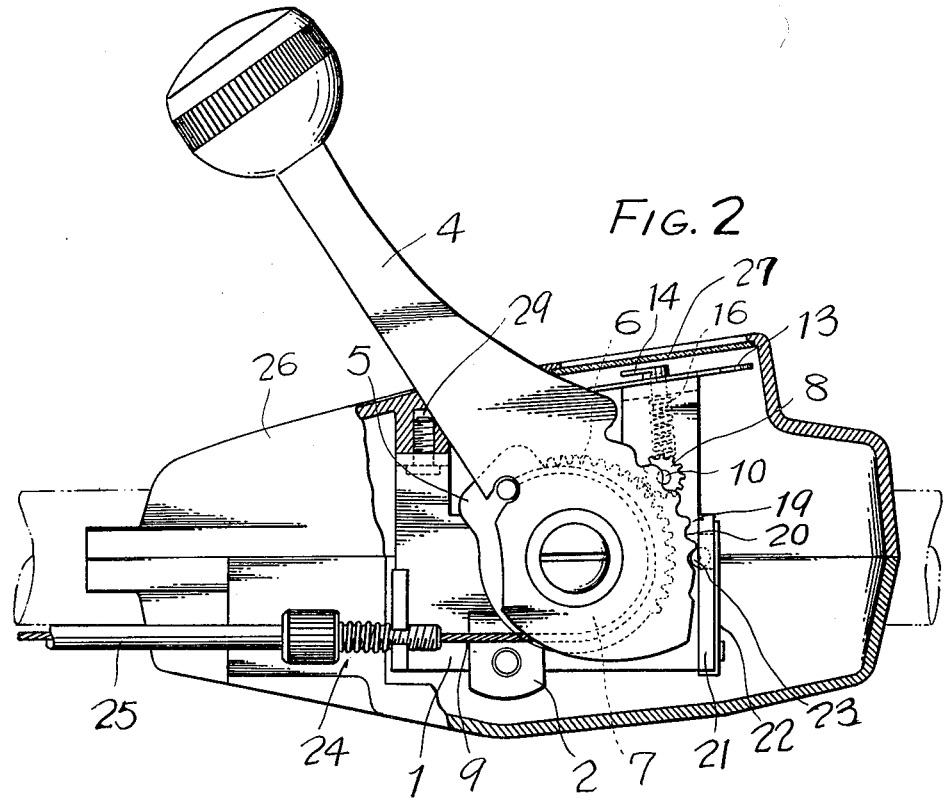

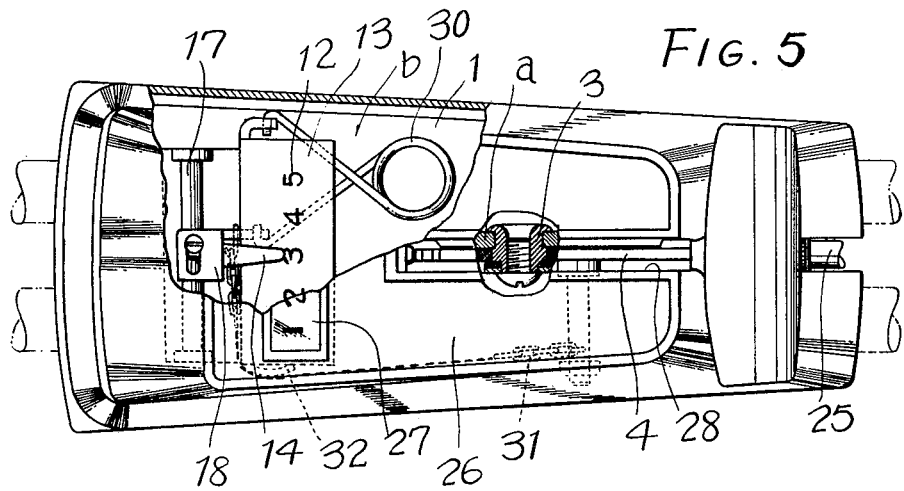
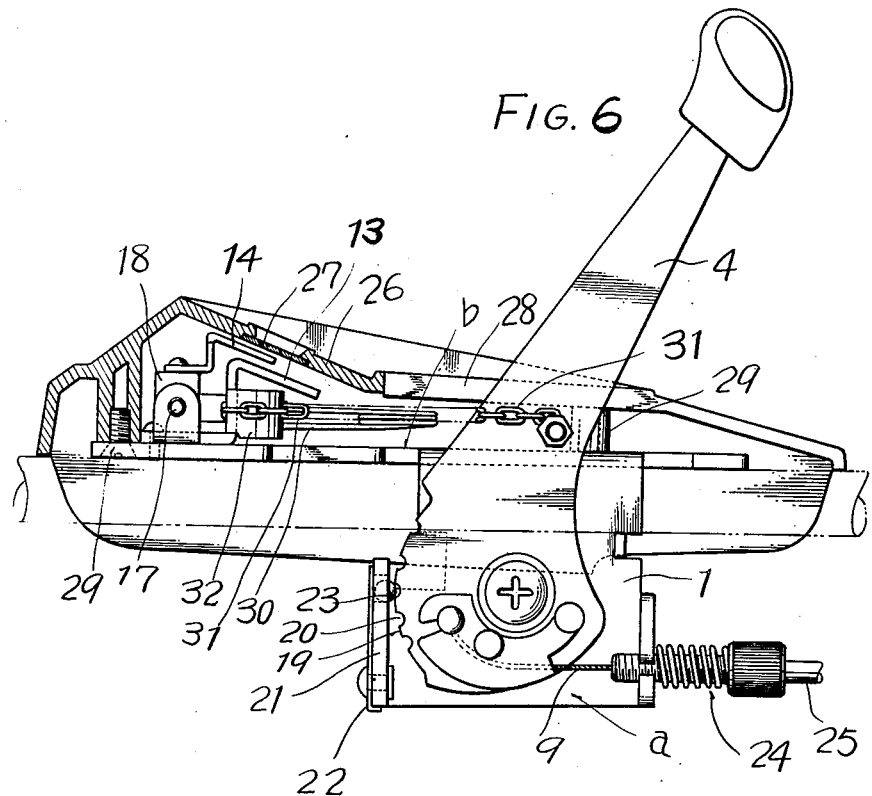

United States Patent Office 3,499,346
Patented Mar. 10, 1970

3,499,346
INDICATING SYSTEM OF SPEED-CHANGING
CONDITION FOR A BICYCLE
Takuo Ishida and Masayoshi Kine, both c/o Shimano Industry Co., 77, 3-cho, Oimatu-cho, Sakai, Osaka, Japan
Filed May 22, 1968, Ser. No. 731,096
Claims priority, application Japan, Apr. 19, 1968,
43/32,014, 43/32,015
Int. Cl. F16c 1/10; G05g 1/08
U.S. Cl. 74—501                                   5 Claims

ABSTRACT OF THE DISCLOSURE

Apparatus for indicating the positions of gear shifting lever on a bicycle comprising a frame which is attachable to the bicycle, gear position indicator, a gear shifting lever, which lever is located away from the indicator, and flexible drive mechanism connectable between the lever and the indicator for moving the position indicator in response to movement of the lever.

---

This invention is related to a speed indicating system which enables a cycler to confirm with readiness the changed speed condition of a bicycle when he moves a shift lever for changing speed.

Referring to the conventional type of a speed indicating system for this purpose, use has been made of such a device that a shift lever is provided immediately with an indicator, and in a peripheral portion of the shelter covering the lever is provided a graduation plate showing each speed. However, such a device is not free of the deficiencies that a graduation plate must be set to locate at an extremely confined place in accordance with the position of the channel for a lever movement, so that a cycler in a normally seated posture is unable to look squarely at the indicator with the least danger as his view is obstructed with either the knob of the shift lever or his hand operating the lever; furthermore the graduation plate being confined within a restricted place as has been mentioned it is infeasible to make the graduation much larger in any desirable size for a better glance.

Accordingly, one of the main objects of the present invention is to supply the speed indicating system that can be selectively installed on a bicycle at the easiest position of an indicator to look at for a cycler seated in a normal posture, independent of a positional relation between the system and the shift lever, thereby making it possible to set free the relative position of what the graduation is to the lever, irrespective of the graduation-plate size.

Another object of the invention is to supply a speed indicating system that can be easily mounted on a bicycle by use of the fixing elements of the shift lever, and so constructed as a whole as to enable a cycler not only to confirm the speed-changing operation simultaneously he is operating the shift lever but also to see the changed speed condition when and after the speed has been changed.

The present invention is firstly characterized in the construction that by means of the fixing elements of the shift lever for fixing to the frame of a bicycle, it is quite possible to mount a speed indicating system composed of an indicating plate and an indicator optionally onto any desirable portion of said fixing elements, whereby the movement of the shift lever is transmissibly connected to the indicator of the system.

While all the particulars of the invention are as explained in the succeeding specification accompanied by the drawings, its noble features are as set forth in what is claimed.

Referring to each figure of the accompaning drawings, FIGURES 1 through 4 illustrate one of the embodiments in accordance with the present invention respectively, and especially FIG. 1 is a plan view showing a part thereof,
FIG. 2 is a lateral view showing a part thereof,
FIG. 3 is a cross section of the part of FIG. 2,
FIG. 4 is a cross section of the same part,
FIG. 5 is a plan view showing partially another embodiment of the invention and
FIG. 6 is a lateral view showing a part thereof.

Now setting forth in the details the embodiment of the present invention especially in reference to FIGURES 1 through 4 respectively, reference numeral 1 designates a fixing plate having a tightening portion 2 and said fixing plate 1 has also on its one side a laterally protruded axis 3 to support a shift lever 4. At 5 is denoted an integral gear provided with gear teeth 6 in its peripheral portion. A roll plate 7 of the inner wire 9 is fixedly mounted on one side of the shift lever 4 so that it is to rotate at the same direction of said axis 3 when the shift lever 4 rotates. A pinion 8 is so provided on one side of the fixing plate 1 that it is engaged with the gear teeth 6 of the integral gear 5 and ready to rotate at the same direction of the axis 10. On the supporting element 11 extending outwardly of the fixing plate 1 is fixed the indicating plate 13 marked with desired signs 12 such as numerals in accordance with the proportion of speed arranged to the speed-changing system of a bicycle. Said indicating plate 13 supports in its hub the pivot 15 having an indicator 14. The axis 10 of said pinion 8 is movably connected with the pivot 15 by means of a flexible shaft 16. The segment 19 formed in the peripheral portion of the shift lever 4 includes a plurality of notches 20 provided at a proper distance. A resisting plate 21 against said segment 19 extends from the fixing plate 1 to press the segment 19 with the ball 23 oppressively mounted between this segment and the resisting plate 21 by means of a plate spring 22. According as the shift lever is moved, each notch 20 of the segment 19 is made gradually to engage with the ball 20. The spiral spring 25 is supported with the supporting bolt 24. The whole body of the system is covered with the shelter 26 on whose corresponding portion to the indication plate 13 is adapted a transparent plate 27. In order to provide the channel for the movement of the shift lever 4 there is formed a slot 28. Said shelter 26 is fixed on the frame of a bicycle by means of the fixing elements 29.

In this embodiment of the invention, it is noted that the notches 20 are to be engaged one after another with the ball 23 according as the shift lever 4 is moved on the laterally protruded axis 3, and at the same time the inner wire 9 is pulled with a jerk or restored. Simultaneously, the integral gear 6 is also rotated to clockwise or counter-clockwise rotate the pinion 8 engaged with the integral gear 6, with the result that the pivot 15 of the indicator 14, connected to the axis 10 of this pinion 8 through the flexible shaft 16, is also rotated to change the direction of the indicator 14.

It is from this understood that the indicator 14 is to rotate in proportion as the shift lever 4 is moved. Thus in each movement of the shift lever 4, each indication can be secured by each sign 12 marked on the indicating plate 13 at the interval exactly proper to each shift of the speed-changing system. Accordingly, a cycler is able to confirm the changed speed condition by looking at this sign 12 indexed by the indicator 14.

While what has been mentioned above is about the construction of a rotatory indicator only, the objects of the present invention do not merely lie in this but in an adaptation of the improved construction of a slide indicator as well.

Now accounting for this slide indicator in reference to the embodiment of the present invention shown in FIGURES 5 and 6, a fixing plate similarly denoted at 1 comprises a vertical plate *a* and a horizontal fixing plate *b*, the former supporting a shift lever 4 and the latter being to fix thereon the indicating plate 13 marked with each sign 12 in proportion to each shift of the speed indicating system for a bicycle. On one side of the indicating plate 13 and in parallel to the direction of sign marking is provided a rod 17 where a sustainer 18 of the indicator 14 is movably supported. A spring 30 fixed at one end is secured at other end to the protruding edge of the sustainer 18. Reference numeral 31 designates a linking made from a flexible material like a chain or wire, whose one end is fixed to said edge of the sustainer 18 and other end is fixed onto one side of the shift lever 4 so that the movement of this lever is transmitted directly to the sustainer 18 along a guide plate 32 substantially provided at the place where the linking 31 is made bent, namely, on one side of the indicating plate 13 as is shown in FIGURES 5 and 6.

In order to secure a desired speed in accordance with this embodiment of the invention, a cycler has only to move the shift lever 4, as this shift lever is then rotated on the axis 3, causing the sustainer 18 of the indicator 14 to slide lengthwise of the rod 17 through the linking 31 like a chain or wire, and consequently the indicator 14 is transferred to the position of the sign 12 of the indicating plate 13, that is, to the position to which a changed speed duly corresponds.

For a fuller understanding, if the shift lever 4 is moved clockwise, the point where this shift lever and the linking 31 are fixed is transferred from the sustainer 18, for example, to the right direction as is shown in FIGURE 6 whereby said sustainer 18 is jerked to move against the spring 30 to the direction where the linking 31 is moved; on the contrary, if the shift lever 4 is moved counterclockwise, then the point where this lever and the linking 31 are fixed is transferred to the sustainer 18, for example, to the left direction as is shown in FIGURE 6 whereby the tension of the linking 31 is relieved and due to the dynamical stability of the spring 30 the sustainer 18 is pulled back to the extent that the linking 31 is transferred.

As has been mentioned, the indicator 14 moves in synchronism with the movement of the shift lever 4 and a cycler can easily have a look at the sign 12 indexed by the indicator 14 to confirm the speed condition that has just been changed. Thus the present invention introduces a noble idea that in order to mount the indicating system, use is made of a piece of the fixing plate for settling a speed system on the frame of a bicycle, and the indicator of this system is movably connected to the movement of the shift lever thereby making it possible to instruct the indicator to index accurately the speed conditions when the shift lever is being moved.

According to the present invention, the indicating system can be constructed in a very simple structure due to the fact that except for a single piece of said fixing plate, there is no need of fixing elements of any other special kinds as a supplement or a replacement for mounting this system. Besides the transmission of movement to the indicator from the shift lever is made possible through the pinion, the flexible shaft and the flexible linking like a chain or wire. Thus it is possible to adapt optionally a preferable size and location of the indicating system irrespective of the disposition of the shift lever.

Therefore, when the shift lever is set on the frame of a bicycle, it is possible to adapt the indicating plate of preferable size in such a place where a cycler can easily look at the indicator while being seated in a normal posture. It is noted that the speed indicating system in accordance with the invention is located close to the shift lever because it is mounted by means of a fixing plate as has been mentioned above. Thus a cycler is able to confirm the shifting operation and notice the changed speed condition simultaneously he is moving the shift lever. Due to the advantages that provide the easiest position of the indication plate to look at and the most desired size thereof, the speed indicating system in accordance with the present invention functions accurately enough to enable a cycler to read the sign of the indicating plate in safety. Incidentally the pinion referred to in the above-mentioned embodiment of the invention is replaceable by the structure that frictionally rotates and it is also possible to construct together with the shift lever as a single unit the pinion and other elements that function to transmit movements.

It is believed that many advantages of a speed indicating system embodying this invention will be readily understood, and although preferred embodiments are as illustrated and described, it is also to be noted that further modifications and changes in the details of the construction and in combination and arrangement of parts may be resorted to which will fall within the purview of the invention as claimed.

What is claimed is:

1. Apparatus for indicating the gear shift condition of a cycle comprising
   (1) supporting structure having vertical portion and horizontal portion;
   (2) means for attaching said vertical portion to said cycle;
   (3) shaft means mounted on said vertical portion and extending substantially perpendicular therefrom;
   (4) handle means having one end thereof moveably disposed on said shaft means and another end thereof extending substantially perpendicular therefrom;
   (5) means for attaching to said one end of said handle means, interconnecting means for effecting change of gears of said cycle, said handle means being moveable to different positions for different gears;
   (6) means located toward said one end of said handle means for holding stationary said handle means in different positions corresponding to different gears;
   (7) indicating plate mounted on said horizontal portion and separate from said handle means, said indicating plate having suitable position indicators thereon;
   (8) pointer means;
   (9) means for movably positioning said pointed means on said indicating plate; and
   (10) connecting means under the control of said handle means for moving said pointer means to positions on said indicating plate indicative of different gears as effectively changed by said handle means.

2. Apparatus according to claim 1, wherein said indicating plate is substantially circular with an axis at the center thereof; said means for moveably positioning comprises (a) means for placing said pointer means rotatably about and axis; and (b) means for moving said pointed means; and said connecting means comprises (a) flexible shaft and (b) a rotatable gear connected to said flexible shaft and driven by said handle means, whereby movement of said handle means drives said rotatable gear, said flexible shaft, said means for moving and thereby said pointer means.

3. Apparatus according to claim 1, wherein said indicating plate is substantially rectangular; said means for moveably positioning comprises (a) rod means mounted on said horizontal portion; (b) carriage means moveably disposed on said rod means and connected to said pointer means; and (c) spring means for biasing said carriage means; and said connecting means comprises (a) linking means connected at one end to said carriage means and opposite to the bias of said spring means, and at another end to said handle means, and (b) guide means for keeping said linking means substantially the same relative vertical position during movement of said linking means, whereby movement of said handle means moves said linking means, said carriage means and said pointer means.

4. Apparatus according to claim 3, wherein said linking means comprises a chain.

5. Apparatus according to claim 3, wherein said linking means comprises a wire.

References Cited

UNITED STATES PATENTS

| | | | |
|---|---|---|---|
| 1,884,804 | 10/1932 | Millington | 74—501 |
| 2,004,918 | 6/1935 | Mitchell | 74—501 XR |
| 2,853,896 | 9/1958 | McCordic | 74—485 |
| 3,355,964 | 12/1967 | Day | 74—504 |
| 3,406,587 | 10/1968 | Brilando et al. | 74—501 XR |
| 3,418,867 | 12/1968 | Maeda | 74—501 XR |

FRED C. MATTERN, Jr., Primary Examiner

F. D. SHOEMAKER, Assistant Examiner

U.S. Cl. X.R.

74—504